United States Patent Office 3,758,491
Patented Sept. 11, 1973

3,758,491
NOVEL ANTI-INFECTIVE AGENTS AND MEANS
OF PRODUCING THE SAME
David B. Capps, Ann Arbor, Mich., assignor to Parke,
Davis & Company, Detroit, Mich.
No Drawing. Continuation-in-part of abandoned application Ser. No. 111,094, Jan. 29, 1971. This application Jan. 7, 1972, Ser. No. 216,281
Int. Cl. C07d 99/06
U.S. Cl. 260—306.7          21 Claims

ABSTRACT OF THE DISCLOSURE

Novel thiazolium salts (I) having pharmacological

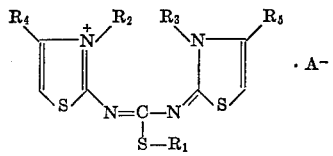

(I)

activity and being particularly useful as anti-infective agents, are provided by: (a) reacting the corresponding 2-[[bis(methylthio)methylene]amino]thiazolium salt and 2-imino-4-thiazoline, (b) reacting methyl iodide and a salt of the corresponding dithio-4-thiazoline-$\Delta^{2,N}$-carbamic acid with 2-imino-4-thiazoline, (c) reacting a compound $R_3X$ and the corresponding 3-(4-thiazolin-2-ylidene)-2-$R_1$-1-(2-thiazolyl)-2-thiopseudourea, (d) reacting a compound $R_1X$ and the corresponding 1,3-bis(3-substituted-4-thiazolin)-2-thiourea, or (e) converting a salt (I) or hydroxide thereof by means of anion exchange; where $R_1$ is a $C_1$–$C_{10}$ alkyl, —$CH_2CON$(lower alkyl)$_2$, —$CH_2COO$(lower alkyl), phenethyl, 2-phenoxyethyl, benzyl, α-methylbenzyl, mono- or dichlorobenzyl, or allyl group; $R_2$ and $R_3$ are the same or different and independently represent a $C_1$–$C_{10}$ alkyl, —$CH_2CH_2OCH_3$, —$CH_2CH_2OH$, benzyl, mono- or dichlorobenzyl, phenethyl, or 2-phenoxyethyl group, one of $R_2$ and $R_3$ additionally representing a —$CH_2CON$(lower alkyl)$_2$ or —$CH_2COO$(lower alkyl group); $R_4$ and $R_5$ are the same or different and independently represent H or $CH_3$; A is an anion; and X is a chloride, bromide or iodide ion or a tosylate or methanesulfonate group.

The present application is a continuation-in-part of application Ser. No. 111,094 filed Jan. 29, 1971 (now abandoned).

SUMMARY AND DETAILED DESCRIPTION

The present invention relates to novel chemical compounds and means of producing the same. More particularly, the invention relates to novel thiazolium salt compounds having the formula

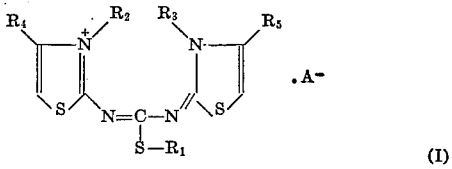

(I)

where $R_1$ is a $C_1$–$C_{10}$ alkyl, —$CH_2CON$(lower alkyl)$_2$, —$CH_2COO$(lower alkyl), phenethyl, 2-phenoxyethyl, benzyl, α-methylbenzyl, mono- or dichlorobenzyl, or allyl group; $R_2$ and $R_3$ are the same or different and independently represent a $C_1$–$C_{10}$ alkyl, —$CH_2CH_2OCH_3$, —$CH_2CH_2OH$, benzyl, mono- or dichlorobenzyl phenethyl, or 2-phenoxyethyl group, one of $R_2$ and $R_3$ also representing a —$CH_2CON$(lower alkyl)$_2$ or —$CH_2COO$ (lower alkyl) group; $R_4$ and $R_5$ are the same or different and independently represent H or $CH_3$; and A is a pharmaceutically acceptable anion; and to process means of producing the same. The term "lower alkyl" as used herein refers to alkyl groups having 1 to 4 carbon atoms. The thiazolium salts of the invention possess pharmacological properties and are useful anti-infective agents. As examples of some of the many physiologically acceptable anions contemplated, there may be mentioned the chloride, bromide, iodide, nitrate, bisulfite bisulfate, hemisulfate, perchlorate, acetate, palmitate, stearate, hemipamoate, picrate, decanesulfonate, 4-chloro-2-(5-chlorosalicyl)phenoxide, hydroxy-naphthoate, dodecylsulfate, cyclohexanesulfamate, phenolphthalein, trichlorophenoxide, 2,2′-thiobis-(4,6-dichlorophenoxide), deoxycholate, 7-chloro-4-hydroxy-3-quinolinecarboxylate, dihydroxyisonicotinate, bromonaphthoxide, hemiadipate, p-toluenesulfonate, hemi-(5,5′-thiodisalicylate), 3,5-dichlorosalicylate, taurocholate, dioctylsulfosuccinate and 2,6-di-iodo-4-nitrophenoxide. In general, the choice of anion is not critical since the above-mentioned cation constitutes the pharmacologically active moiety. Moreover, the selection and provision of the anion portion of the salts in general will be understood by those skilled in the art in accordance with methods and considerations which will be known to them.

According to one embodiment of the invention, thiazolium salts having the above Formula I where $R_1$ is a methyl group are produced by reacting a 2-[[bis(methylthio)methylene]amino]thiazolium salt of formula

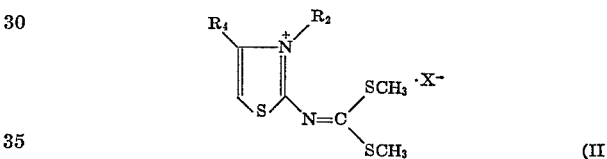

(II)

and a 2-imino-4-thiazoline having the formula

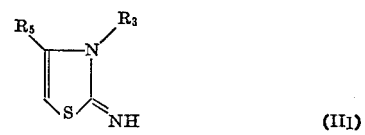

(III)

where $R_2$, $R_3$, $R_4$ and $R_5$ have the above-specified significance; and X is a chloride, bromide or iodide ion or a tosylate or methanesulfonate group. The reaction is carried out in a non-reactive, anhydrous, non-hydroxylic solvent. Acetonitrile is a preferred solvent. The conditions for the reaction are subject to considerable variation. The reaction is carried out at temperatures ranging from −10 to 90° C., preferably in the range from 0 to 30° C. The time required for completion of the reaction varies depending on the nature of the reactants but generally is from 1 to 24 hours when carried out at the temperatures mentioned. For the reaction the reactants are employed in equimolar ratio.

According to another embodiment of the invention, the products having Formula I where $R_1$ is a methyl group and where A⁻ represents an iodide ion are produced by reacting methyl iodide and a salt of a dithio-4-thiazoline-$\Delta^{2,N}$-carbamic acid having the formula

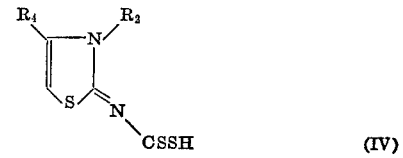

(IV)

with a 2-imino-4-thiazoline having Formula III where $R_2$ and $R_3$ each represent a $C_1$–$C_{10}$ alkyl group and $R_4$ and $R_5$ have the above-specified significance. The reaction is carried out in a two-phase liquid reaction medium such as water-excess methyl iodide, water-chloroform, water-ether, or similar two-phase reaction medium. The reaction is carried out in the presence of sodium hydroxide. About 2–10 moles of methyl iodide and from 1–2 moles of sodium hydroxide are employed for each mole of the carbamic acid-thiazoline salt. A 5:1:1 ratio is preferred. The reaction conditions are subject to considerable variation. In general, the reaction is carried out at temperatures in the range from about 0–50° C. and preferably in the range from 10–30° C. The time required for completion of the reaction varies from about ½ to 10 hours.

According to a further embodiment of the invention, compounds having the formula

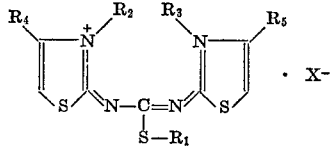

are produced by reacting a compound $R_3X$ and a 3-(4-thiazolin-2-ylidene) - 2 - $R_1$ - (2-thiazolyl)-2-thiopseudourea having the formula

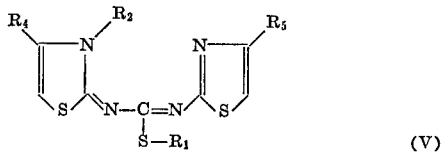

(V)

where $R_1$, $R_2$, $R_3$, $R_4$ and $R_5$ have the above-specified significance and X is a chloride, bromide or iodide ion or a tosylate or methane-sulfonate group. The reaction is carried out in a non-reactive organic solvent such as chloroform, acetone, toluene, ethyl acetate, tetrahydrofuran or dioxane. Acetonitrile or chloroform, or a mixture of these, is preferred. The ratio of reactants can be varied, usually in the range from 1–10 moles of the reactant $R_3X$ for each mole of the thiopseudourea, approximately 3–6 moles being preferred. The reaction conditions can be varied. The temperature of reaction may be in the range from 0–100° C. and preferably in the range from 20–30° C. The reaction time depends on the nature of the reactants but in general is in the range from 1 to 30 days, 5 to 20 days being preferred.

According to yet another embodiment of the invention, compounds having Formula I are produced by reacting a compound $R_1X$ and the corresponding 1,3-bis(3-substituted-4-thiazolin)-2-thiourea having the formula

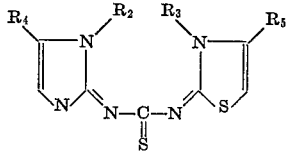

where $R_1$, $R_2$, $R_3$, $R_4$, $R_5$ and X have the above-specified significance. The reaction is carried out either in the absence of a solvent or in a non-reactive organic solvent such as methanol, ethanol, acetone, chloroform, dichloromethane, ethyl acetate, acetonitrile, toluene or tetrahydrofuran. The ratio of reactants can be varied, preferably being equimolar or with the compound $R_1X$ in excess. The reaction conditions are not critical and can be varied. The temperature of the reaction may be in the range from −10 to 100° C. and preferably in the range from 0–70° C., preferably for periods ranging from about 30 minutes to 3 days.

The thiazolium salts of the invention, as indicated, are useful anti-infective agents. The salts, for example, have significant anthelminthic activity. This activity can be demonstrated by a standard pharmacological procedure using the mouse as a test animal. For animals infected with the pinworm Syphacia obvelata, the effective dose for ridding 50% of the animals of infection ($ED_{50}$) is typically less than 100 mg./kg. administered in the diet. The products of the invention also possess antibacterial activity in vitro, the minimum inhibitory concentration typically being, for instance, 20 gamma/ml. or less against Staphylococcus aureus strain UC–76. Further, the products possess antifungal activity in vitro, the minimum inhibitory concentration typically being 10 gamma/ml. or less against Candida albicans and Trichophyton mentagrophytes. Useful compositions can be prepared in suitable dosage form containing products of the invention for prophylactic purposes or for the topical treatment, for example, of superficial fungus infection. Preferred salt products of the invention, for their anti-infective potency, are the following:

2-[[[(3-butyl-4-thiazolin-2-ylidene)amino](methylthio)methylene]amino]-3-hexylthiazolium iodide 3-butyl-2-[[[(3-butyl-4-thiazolin-2-ylidene)amino](methylthio)methylene[amino]thiazolium iodide 3-hexyl-2-[[[(3-hexyl-4-thiazolin-2-ylidene)amino](methylthio)methylene]amino]thiazolium iodide 2-[[[(3 - benzyl-4-thiazolin-2-ylidene)amino](butylthio)methylene]amino]-3-butylthiazolium iodide 3-butyl-2-[[[(3-butyl-4-thiazolin-2-ylidene)amino](butylthio)methylene]amino]thiazolium iodide 3-butyl-2-[[[[3-(2,4-dichlorobenzyl)-4-thiazolin-2-ylidene]amino](methylthio)methylene]amino]thiazolium iodide 2-[[(methylthio)[3-octyl-4-thiazolin-2-ylidene)amino]methylene]amino]-3-octylthiazolium iodide 2-[[(butylthio)[(3-hexyl-4-thiazolin-2-ylidene)amino]methylene]amino]-3-hexylthiazolium bromide 3-ethyl-2-[[[(3-ethyl-4-thiazolin-2-ylidene)amino](hexylthio)methylene]amino]thiazolium bromide 3-butyl-2-[[[(3-butyl-4-thiazolin-2-ylidene)amino][(3,4-dichlorobenzyl)thio]methylene]amino]thiazolium chloride 3-butyl-2-[[[(3-butyl-4-thiazolin-2-ylidene)amino](phenethylthio)methylene]amino]thiazolium bromide 2 - [[(hexylthio)[(3-propyl-4-thiazolin-2-ylidene)amino]methylene]amino]-3-propylthiazolium bromide The invention is illustrated by the following examples:

Example 1: To a stirred mixture of 180.2 g. of 2-[[bis(methylthio)methylene]amino]-3-ethylthiazolium iodide and 1500 ml. of acetonitrile held at 2–5° C. by means of an ice bath is added a solution of 64.1 g. of 3-ethyl-2-imino-4-thiazoline in 110 ml. of acetonitrile over 1 hour. The mixture is stirred and allowed to warm to room temperature overnight. The precipitate is collected and washed with acetone, providing 3-ethyl-2-[[[(3-ethyl-4-thiazolin - 2-ylidene)amino](methylthio)methylene]amino]thiazolium iodide; M.P. 227–230° C. (dec.) after recrystallization from acetonitrile.

Example 2: To a stirred mixture of 38.0 g. of 3-benzyl-2-[[bis(methylthio)methylene]amino]thiazolium iodide and 500 ml. of acetonitrile, held at 2–5° C., is added a solution of 17.1 g. of 3-benzyl-2-imino-4-thiazoline and 40 ml. of acetonitrile over a period of 1 hour. The mixture is stirred and allowed to warm to room temperature overnight. The product, 3-benzyl-2-[[[(3-benzyl-4-thiazolin - 2 - ylidene)amino](methylthio)methylene]amino]thiazolium iodide, is collected and recrystallized from acetonitrile; M.P. 199–202° C.

In the same manner using 44.4 g. of 2-[[bis(methylthio)methylene]amino] - 3 - octylthiazolium iodide, and 21.2 g. of 2-imino-3-octyl-4-thiazoline, the product obtained is 2-[[(methylthio)[3-octyl-4-thiazolin-2-ylidene)amino]methylene]amino]-3-octylthiazolium iodide; M.P. 137–139° C.

Using 43.6 g. of 3-allyl-2-[[bis(methylthio)methylene]amino]thiazolium iodide, and 16.5 g. of 3-allyl-2-imino-4- thiazoline, the product is 3-allyl-2-[[[(3-allyl-4-thiazolin - 2 - ylidene)amino](methylthio)methylene]amino]thiozolium iodide; M.P. 180–183° C.

Similarly, using 10.2 g. of 2-[[bis(methylthio)methylene]amino]-3-(2-hydroxyethyl)thiazolium iodide, 3.9 g. of 3-(2-hydroxyethyl)-2-imino-4-thiazoline, and 200 ml. of acetonitrile as a reaction medium, the product is 3 - (2 - hydroxyethyl) - 2 - [[[[3-(2-hydroxyethyl)-4-thiazolin - 2 - ylidene]amino](methylthio)methylene]amino]thiazolium iodide; M.P. 190–192° C. after recrystallization from methanol.

When using 25.0 g. of 2-[[bis(methylthio)methylene]amino]-3-decylthiazolium iodide, 12.7 g. of 3-decyl-2-imino-4-thiazoline, and 350 ml. of acetonitrile as a reaction medium, the product is 3-decyl-2-[[[(3-decyl-4-thiazolin - 2 - ylidene)amino](methylthio)methylene]amino]thiazolium iodide; M.P. 149–151° C.

Example 3: To a stirred mixture of 26.5 g. of 2-[[bis(methylthio)methylene]amino]-3-hexylthiazolium iodide and 600 ml. of acetonitrile, held at approximately 2–5° C. with an ice bath, is added a solution of 9.9 g. of 3-butyl-2-imino-4-thiazoline and 50 ml. of acetonitrile, over a period of 1 hour. The mixture is stirred and allowed to warm to room temperature overnight. The resulting yellow solution is evaporated under reduced pressure and the residue recrystallized from acetonitrile, providing 2-[[[(3-butyl - 4 - thiazolin-2-ylidene)amino](methylthio)methylene]amino]-3-hexylthiazolium iodide; M.P. 141–143° C.

In the same manner, using 40.2 g. of 2-[[bis(methylthio)methylene]amino]-3-pentylthiazolium iodide, and 17.0 g. of 3-pentyl-2-imino-4-thiazoline, the product obtained is 2 - [[(methylthio)[(3 - pentyl - 4 - thiazolin-2-ylidene)amino]methylene]amino] - 3 - pentylthiazolium iodide; M.P. 159–162° C.

When using 26.8 g. of 2-[[bis(methylthio)methylene]amino]-3-butylthiazolium iodide, and 10.8 g. of 3-butyl-2-imino-4-thiazoline, the product obtained is 3-butyl-2-[[[(3 - butyl - 4 - thiazolin-2-ylidene)amino]methylthio)methylene]amino]thiazolium iodide; M.P. 143–145° C.

Substituting 39.0 g. of 2-[[bis(methylthio)methylene]amino]-3-(2-methoxyethyl)thiazolium iodide, and 15.8 g. of 3-(2-methoxyethyl)-2-imino-4-thiazoline, the product obtained is 3(2 - methoxyethyl) - 2 - [[[3-(2-methoxyethyl) - 4 - thiazolin - 2 - ylidene]amino](methylthio)methylene]amino]thiazolium iodide; M.P. 172–174° C.

Using 22.1 g. of 2-[[bis(methylthio)methylene]amino]-3-pentylthiazolium iodide, and 7.9 g. of 3-(2-hydroxyethyl)-2-imino-4-thiazoline, the product is 2-[[[3-(2-hydroxyethyl) - 4 - thiazolin - 2 - ylidene](methylthio)methylene]amino]-3-pentylthiazolium iodide; M.P. 118–120° C.; and using 8.4 g. of 3-benzyl-2-[[bis(methylthio)methylene]amino]thiazolium iodide, 3.1 g. of 3-butyl-2-imino-4-thiazoline, and 200 ml. of acetonitrile as the reaction medium, the product is 3-benzyl-2-[[[(3-butyl-4-thiazolin - 2 - ylidene)amino](methylthio)methylene]amino]thiazolium iodide; M.P. 155–157° C.

As a further example, using 12.7 g. of 3-benzyl-2-[[bis(methylthio)methylene]amino]thiazolium iodide, 6.4 g. of N,N-diethyl-2-imino-4-thiazoline-3-acetamide, and 200 ml. of acetonitrile as a reaction medium, the product is 3 - benzyl - 2 - [[[3-[(diethylcarbamoyl)methyl]-4-thiazolin - 2 - ylidene](methylthio)methylene]amino]thiazolium iodide; M.P. 197–199° C.; and also by the same procedure using 10.0 g. of 2-[[bis(methylthio)methylene]amino]-3-pentylthiazolium iodide, 4.3 g. of 2-imino-4-thiazoline-3-acetic acid, methyl ester, and 150 ml. of acetonitrile as a reaction medium, the product is 3-(carboxymethyl) - 2 - [[[(methylthio)(3-pentyl-4-thiazolin-2 - ylidene)amino]methylene]amino]thiazolium iodide, methyl ester; M.P. 163–166° C. (dec.).

Example 4: To a stirred mixture of 41.6 g. of 2-[[bis(methylthio)methylene]amino]-3-hexylthiazolium iodide and 600 ml. of acetonitrile, a solution of 18.4 g. of 3-hexyl-2-imino-4-thiazoline in 70 ml. of acetonitrile is added during a period of over 75 minutes at 2–5° C. The mixture is stirred for 3 hours, warming slowly to room temperature, then cooled to 5° C. The product precipitates and is collected; M.P. 153–155° C. The product is 3-hexyl-2-[[[(3-hexyl - 4 - thiazolin-2-ylidene)amino](methylthio)methylene]amino]thiazolium iodide.

Example 5: To a vigorously stirred suspension of 63.4 g. of 3-propyldithio-4-thiazoline-Δ²,ᴺ-carbamic acid, salt with 1 formula weight of 2-imino-3-propyl-4-thiazoline in 1200 ml. of water, held at 2–5° C. by means of an ice bath, is added 87 ml. of iodomethane. A solution of 7.04 g. of sodium hydroxide in 140 ml. of water is then added over 1 hour. The mixture is kept cold for one-half hour longer, then allowed to warm to room temperature over 2 hours. The product is collected, dried and recrystallized first from acetonitrile-ether and then from acetonitrile; M.P. 161–163° C. The product is 2-[[(methylthio)[(3 - propyl - 4 - thiazolin-2-ylidene)amino]methylene]amino]-3-propylthiazolium iodide.

Example 6: A mixture of 4.9 g. of 3-(3-butyl-4-thiazolin - 2 - ylidene)-2-[(diethylcarbamoyl)methyl]-1-(2-thiazolyl)-2-thiopseudourea, 10.0 ml. of benzyl chloride, and 80 ml. of acetonitrile is allowed to stand at room temperature for two weeks. The product, 3-benzyl-2-[[[(3-butyl - 4 - thiazolin-2-ylidene)amino][[(diethylcarbamoyl)methyl]thio]methylene]amino]thiazolium chloride, is collected and recrystallized from acetonitrile; M.P. 196–197° C. (dec.).

In the same manner but using 10.0 ml. of 1-iodobutane in place of benzyl chloride, the product obtained is 3-butyl - 2 - [[[(3-butyl - 4 - thiazolin-2-ylidene)amino][(diethylcarbamoyl)methyl]thio]
methylene]amino]thiazolium
iodide; M.P. 194–196° C. after recrystallization from acetonitrile-ether.

Example 7: A mixture of 5.0 g. of 3-[3-(o-chlorobenzyl) - 4 - thiazolin-2-ylidene]-2-methyl-1-(2-thiazolyl)-2-thiopseudourea, 10.0 ml. of o-chlorobenzyl chloride, and 30 ml. of acetonitrile is allowed to stand at room temperature for two weeks. Half the solvent is removed by evaporation and ether is then added to precipitate the product 3-(o-chlorobenzyl) - 2 - [[[3-(o-chlorobenzyl)-4 - thiazolin - 2 - ylidene]amino](methylthio)methylene]amino]thiazolium chloride. The product is washed with fresh ether and crystallized from acetonitrile-ethylacetate; M.P. 206–208° C.

In the same manner, using 4.4 g. of [[[(3-butyl-4-thiazolin - 2 - ylidene)amino](2 - thiazolylimino)methyl]thio]acetic acid, methyl ester, 10.0 ml. of 1-iodobutane, and 20 ml. of acetonitrile, the product obtained is 3-butyl - 2 - [[[(3-butyl - 4 - thiazolin-2-ylidene)amino][(carboxymethyl)thio]methylene]amino]thiazolium iodide, methyl ester; M.P. 110–115° C.

Example 8: A mixture of 9.5 g. of 3-[3-(2,4-dichlorobenzyl)-4-thiazolin - 2 - ylidene]-2-methyl-1-(2 - thiazolyl)-2-thiopseudourea, 10.0 ml. of 1-iodobutane, and 100 ml. of chloroform is allowed to stand at room temperature for 12 days, with occasional swirling. The mixture is evaporated at room temperature to an amber oil and the latter washed by trituration with ethyl acetate and crystallized from acetonitrile; M.P. 89–92° C. The product obtained is 3-butyl-2-[[[[3-(2,4-dichlorobenzyl)-4-thiazolin - 2 - ylidene]amino](methylthio)methylene]amino]thiazolium iodide.

In the same manner using 9.5 g. of 3-[3-(2,4-dichlorobenzyl)-4-thiazolin - 2 - ylidene]-2-methyl-1-(2-thiazolyl)-2-thiopseudourea, 6.0 ml. of α,2,4-trichlorotoluene, and 100 ml. of chloroform, the product obtained is 3-(2,4-dichlorobenzyl) - 2 - [[[3-(2,4-dichlorobenzyl) - 4 - thiazolin - 2 - ylidene]amino](methylthio)methylene]amino]thiazolium chloride; M.P. 175–177° C.

Similarly, using 9.5 g. of 3-[3-(p-chlorobenzyl)-4-thiazolin - 2 - ylidene₅-2-methyl-1-(2 - thiazolyl)-2-thiopseudourea, 10.0 ml. of p,α-dichlorotoluene and 100 ml. of chloroform, the product obtained is 3-(p-chlorobenzyl)-

2-[[[[3-(p-chlorobenzyl)-4-thiazolin - 2 - ylidene]amino] (methylthio)methylene]amino]thiazolium chloride; M.P. 144–149° C.

Example 9: A mixture of 5.0 g. of 3-[3-(o-chlorobenzyl)-4-thiazolin - 2 - ylidene)-2-methyl-1-(2-thiazolyl)-2-thiopseudourea, 10.0 ml. of 1-iodobutane, and 30 ml. of acetonitrile is allowed to stand at room temperature for 6 days. The mixture is evaporated to a residue which is washed with ethyl acetate and recrystallized from acetonitrile, providing the product 3-butyl-2-[[[[3-(o-chlorobenzyl) - 4 - thiazolin - 2 - ylidene]amino](methylthio) methylene]amino]thiazolium iodide; M.P. 120–125° C. (dec.).

In the same manner but substituting 4.51 g. of 3-(3-benzyl - 4 - thiazolin-2-ylidene)-2-ethyl-1-(2-thiazolyl)-2-thiopseudourea, the product obtained is 2-[[[(3-benzyl-4-thazolin - 2 - ylidene)amino](ethylthio)methylene]amino]-3-butylthiazolium iodide; M.P. 152–154° C.

Likewise, substituting 5.3 g. of 2-allyl-3-(3-butyl-4-thiazolin - 2 - ylidene)-1-(2-thiazolyl)-2-thiopseudourea, the product is 2-[[(allylthio)[(3-butyl-4-thiazolin-2-ylidene)amino]methylene]amino]-3-butyl thiazolium iodide; M.P. 154–156° C. and with 4.8 g. of 3-(3-benzyl-4-thiazolin-2-ylidene)-2-butyl-3-(2-thiazolyl) - 2 - thiopseudourea the product is 2-[[[(3-benzyl - 4 - thiazolin-2-ylidene)amino] (butylthio)methylene]amino]-3-butyl thiazolium iodide; M.P. 146–418° C. from acetonitrile-ether.

Using 4.9 g. of 3-(3-butyl-4-thiazolin-2-ylidene)-2-ethyl-1-(2-thiazolyl)-2-thiopseudourea, the product is 3-butyl-2-[[[(3 - butyl - 4 - thiazolin - 2 - ylidene)amino] (ethylthio)methylene]amino]thiazolium iodide; M.P. 140–141° C.

Using 10.0 g. of 3-(3-butyl-4-thiazolin-2-ylidene)-2-butyl-1-(2-thiazolyl)-2-thiopseudourea, the product is 3-butyl-2-[[[(3-butyl - 4 - thiazolin - 2 - ylidene)amino] (butylthio)methylene]amino]thiazolium iodide; M.P. 149–151° C.

Example 10: A mixture of 9.5 g. of 3-[3-(p-chlorobenzyl)-4-thiazolin - 2 - ylidene₅-2-methyl-1-[2-thiazolyl)-2-thiopseudourea, 65 ml. of acetonitrile, 100 ml. of chloroform, and 10.0 ml. of 1-iodobutane is allowed to stand at room temperature for 10 days with occasional swirling. Volatiles are removed by evaporation at room temperature, and the residue recrystallized twice from acetonitrile. The product is 3-butyl - 2 - [[[[3-(p-chlorobenzyl)-4-thiazolin - 2 - ylidene]amino](methylthio)methylene]amino]thiazolium iodide; M.P. 177–179° C.

By the same procedure using 4.3 g. of 2-benzyl-3-(3-butyl - 4 - thiazolin - 2 - ylidene)-1-(2-thiazolyl)-2-thiopseudourea, the product is 2-[[(benzylthio)[(3-butyl-4-thiazolin - 2 - ylidene)amino]methylene]amino]-3-butyl-thiazolium iodide; M.P. 169–171° C. without recrystallization.

Example 11: A mixture of 4.7 g. of 3-(3-ethyl-4-thiazolin-2-ylidene)-2-methyl - 1 - (2 - thiazolyl) - 2 - thiopseudourea, 2.0 ml. of methyl chloroacetate, and 50 ml. of acetonitrile is heated under reflux for 30 hours. The mixture is evaporated to 25 ml. and cooled, precipitating the product which is recrystallized first from acetonitrile-ethylacetate, and then from acetonitrile. The product is 2 - [[[[3-(carboxymethyl)-4-thiazolin-2-ylidene]amino] (methylthio)methylene]amino]-3 - ethylthiazolium chloride, methyl ester; M.P. 172–174° C.

Example 12: A mixture of 4.51 g. of 3-(3-benzyl-4-thiazolin - 2 - ylidene)-2-ethyl-1(2-thiazolyl)-2-thiopseudourea, 10.0 ml. of benzyl chloride, and 10 ml. of acetonitrile is allowed to stand at room temperature for 7 days. The product, in the form of a precipitate, is collected and recrystallized from acetonitrile. The product is 3-benzyl - 2 - [[[(3 - benzyl-4-thiazolin-2-ylidene]amino] (ethylthio)methylene]amino]thiazolium chloride; M.P. 210–212° C.

By the same procedure using 6.8 g. of 3-(3-benzyl-4-thiazolin - 2 - ylidene)-2-butyl-3-(2-thiazolyl)-2-thiopseudourea, the product is 3-benzyl-2-[[[(3-benzyl-4-thiazolin - 2 - ylidene)amino](butylthio)methylene]amino]thiazolium chloride M.P. 190–194° C.

Example 13: Five grams of Amberlite® IRC–50 resin is treated with 0.8 g. of sodium hydroxide in 100 ml. of water, collected, and washed with water. To a suspension of the resin in 100 ml. of water is added 5.0 g. of 3-butyl - 2 - [[[(3 - butyl - 4 - thiazolin-2-ylidene)amino] (methylthio)methylene]amino]thiazolium iodide and the mixture allowed to stand 4 days with stirring the last day. The resinate product, 3-butyl-2-[[[(3-butyl-4-thiazolin-2-ylidene) amino] (methylthio) methylene] amino] thiazolium resinate, is collected, washed and air-dried. The resinate contains 37% of the thiazolium cation. To obtain the corresponding thiazolium chloride salt, a column of the resinate is eluted with excess 10% aqueous hydrochloric acid. The eluate is concentrated and the thizolium chloride salt isolated from the concentrate upon standing by recrystallization from acetonitrile. Similarly, the thiazolium acetate is obtained by this procedure using dilute acetic acid as an eluant.

Example 14: A mixture of 1,3-bis(3-butyl-4-thiazolin-2-ylidene)-2-thiourea (0.53 g.), acetonitrile (3 ml.) and chloroform (1 ml.) is warmed to form a solution. The solution is cooled and methyl iodide (0.12 ml.) is added just as a precipitate starts to form. After standing for one hour, the solvent is removed by evaporating on a steam bath. The product remaining is 3-butyl-2-[[[(3-butyl-4-thiazolin - 2 - ylidene)amino](methylthio)methylene] amino]thiazolium iodide; M.P. 132–144° C. after recrystallization from acetonitrile.

Example 15: A mixture of 4.1 g. of 1,3-bis[3-hexyl-4-thiazolin-2-ylidene)-2-thiourea, 1.4 ml. of 1-bromobutane and 15 ml. of acetonitrile is heated at reflux for one hour, then allowed to stand at room temperature for 16 hours. The solution is diluted with 50 ml. of ethyl acetate and the resulting product, 2-[[(butylthio)[(3-hexyl-4-thiazolin - 2 - ylidene)amino]methylene]amino] - 3 - hexylthiazolium bromide, is collected by filtration, washed with ethyl acetate and dried M.P. 164–166° C. after recrystallzation from acetonitrile-ethyl acetate.

In a similar manner, by reaction of the appropriate haloalkane (or aralkyl halide) and substituted thiourea, the following thiazolium salts are obtained:

3-butyl-2-[[[(3-butyl-4-thiazolin-2-ylidene)amino][(2-phenoxyethyl)thio]methylene]amino]thiazolium bromide 3-butyl-2-[[[(3-butyl-4-thiazolin-2-ylilene)amino][(p-chlorobenzyl)thio]methylene]amino]thiazolium chloride 2-[[(ethylthio)[(3-phenethyl-4-thiazolin-2-ylidene) amino]methylene]amino]-3-phenethylthiazolium bromide 2-[[(hexylthio)[[3-(2-phenoxyethyl)-4-thiazolin-2-ylidene amino]methylene]amino]-3-(2-phenoxyethyl)thiazolium bromide 2-[[(butylthio)[[3-(α-methylbenzyl)-4-thiazolin-2-ylidene]amino]methylene]amino]-3-(α-methylbenzyl)thiazolium bromide The following Examples 16–32 illustrate the preparation of other thiazolium salts in a manner similar to Example 15:

Example 16: 3 - ethyl - 2 - [[[(3-ethyl-4-thiazolin-2-ylidene)amino] (hexylthio)methylene]amino]thiazolium bromide, from 1,3-bis(3-ethyl-4-thiazolin-2-ylidene)-2-thiourea and 1-bromohexane by heating at reflux for 45 minutes in acetonitrile; M.P. 166–168° C. after crystallization from acetonitrile-ethyl acetate.

Example 17: 3 - ethyl - 2 - [[[(3-ethyl-4-thiazolin-2-ylidene)amino] (phenethylthio)methylene]amino]thiazolium bromide, from 1,3 - bis(3 - ethyl - 4 - thiazolin-2-ylidene)-2-thiourea and phenethyl bromide by heating at reflux for 30 minutes in acetonitrile; M.P. 162–164° C. after crystallization from acetonitrile.

Example 18: 2-[[[(3,4-dichlorobenzyl)thio][(3-ethyl-4 - thiazolin-2-ylidene)amino]methylene]amino]-3-ethylthiazolium chloride, monohydrate, from 1,3-bis(3-ethyl-4-thiazolin-2-ylidene)2-thiourea and 3,4-dichlorobenzyl chloride by heating at reflux for 45 minutes in acetonitrile; M.P. 116–118° C. after recrystallization from ethyl acetate-dichloromethane.

Example 19: 3 - butyl - 2 - [[[(3 - butyl - 4 - thiazolin-2 - ylidene)amino](hexylthio)methylene]amino]thiazolium bromide, from 1,3-bis(3-butyl-4-thiazolin-2-ylidene) 2-thiourea and 1-bromohexane by heating at reflux for 1 hour in acetonitrile; M.P. 149–150° C. after crystallization from acetonitrile-ethyl acetate.

Example 20: 3 - hexyl - 2 - [[[(3 - hexyl - 4 - thiazolin-2 - ylidene)amino](hexylthio)methylene]amino]thiazolium bromide, from 1,3-bis(3-hexyl - 4 - thiazolin-2-ylidene)-2-thiourea and 1-bromohexane by heating at reflux for 3 hours in acetonitrile; M.P. 164–166° C. after crystallization from acetonitrile-ethyl acetate.

Example 21: 3-hexyl-2-[[[(3-hexyl-4-thiazolin-2-ylidene)amino](phenethylthio)methylene]amino]thiazolium bromide, from 1,3-bis(3-hexyl-4-thiazolin-2-ylidene)-2-thiourea and phenethyl bromide by heating at reflux for 1 hour in acetonitrile; M.P. 134–135° C. after crystallization from acetonitrile-ethyl acetate.

Example 22: 3 - octyl - 2 - [[[(3 - octyl - 4 - thiazolin-2 - ylidene)amino](phenethylthio)methylene]amino]thiazolium bromide, from 1,3 - bis(3-octyl-4-thiazolin-2-ylidene)-2-thiourea and phenethyl bromide by heating at reflux for 1 hour in acetonitrile; M.P. 136–137° C. after crystallization from acetonitrile-ethyl acetate.

Example 23: 2 - [[(butylthio)[3 - octyl - 4 - thiazolin-2-ylidene)amino]methylene]amino] - 3 - octylthiazolium bromide, from 1,3 - bis(3 - octyl-4-thiazolin-2-ylidene)-2-thiourea and 1-bromobutane by heating at reflux for 1 hour in acetonitrile; M.P. 155–156° C. after crystallization from acetonitrile-ethyl acetate.

Example 24: 2 - [[(butylthio)[(3-pentyl - 4 - thiazolin-2 - ylidene)amino]methylene]amino]-3-pentylthiazolium bromide, from 1,3 - bis(3-pentyl-4-thiazolin-2-ylidene)-2-thiourea and 1-bromobutane by heating at reflux for 2 hours in acetonitrile; M.P. 163–164° C. after crystallization from acetonitrile-ethyl acetate.

Example 25: 3 - pentyl - 2 - [[[(3 - pentyl-4-thiazolin-2 - ylidene)amino](pentylthio)methylene]amino]thiazolium bromide, from 1,3-bis(3-pentyl - 4 - thiazolin-2-ylidene) 2 thiourea and 1-bromopentane by heating at reflux for 2 hours in acetonitrile; M.P. 163–164° C. after crystallization from acetonitrile-ethyl acetate.

Example 26: 2-[[(hexylthio)[(3-pentyl - 4 - thiazolin-2 - ylidene)amino]methylene]amino] - 3 - pentylthiazolium bromide, from 1,3-bis(3-pentyl - 4 - thiazolin-2-ylidene)-2-thiourea and 1-bromohexane by heating at reflux for 1 hour in acetonitrile; M.P. 161–162° C. after crystallization from acetonitrile-ethyl acetate.

Example 27: 2 - [[(butylthio)[(3 - propyl - 4 - thiazolin - 2 - ylidene)amino]methylene]amino] - 3 - propylthiazolium bromide, from 1,3-bis(3-propyl-4-thiazolin-2-ylidene)-2-thiourea and 1-bromobutane by heating at reflux for 1 hour in acetonitrile; M.P. 150–152° C. after crystallization from acetonitrile-ethyl acetate.

Example 28: 2 - [[(pentylthio)[3 - propyl-4-thiazolin-2 - ylidene)amino]methylene]amino - 3 - propylthiazolium bromide, from 1,3-bis(3-propyl - 4 - thiazolin-2-ylidene)-2-thiourea and 1-bromopentane by heating at reflux for 1 hour in acetonitrile; M.P. 166–168° C. after crystallization from acetonitrile-ethyl acetate.

Example 29: 2 - [[(hexylthio)[(3 - propyl-4-thiazolin-2 - ylidene)amino]methylene]amino] - 3 - propylthiazolium bromide, from 1,3-bis(3-propyl - 4 - thiazolin-2-ylidene)-2-thiourea and 1-bromohexane by heating at reflux for 1 hour in acetonitrile; M.P. 150–152° C. after crystallization from acetonitrile-ethyl acetate.

Example 30: 2 - [[(hexylthio)[(3-methyl-4-thiazolin-2 - ylidene)amino]methylene]amino]-3-methylthiazolium bromide, from 1,3-bis(3-methyl-4-thiazolin-2-ylidene)-2-thiourea and 1-bromohexane by heating at reflux for 3 hours in acetonitrile; M.P. 193–196° C. after crystallization from acetonitrile-ethyl acetate.

Example 31: 2-[[(butylthio)[(3-methyl - 4 - thiazolin-2 - ylidene)amino]methylene]amino] - 3 - methylthiazolium bromide, from 1,3-bis(3-methyl - 4 - thiazolin-2-ylidene)-2-thiourea and 1-bromobutane by heating at reflux for 2.5 hours in acetonitrile; M.P. 179–181° C. after crystallization from acetonitrile-ethyl acetate.

Example 32: 2 - [[(decylthio)[(3-methyl-4-thiazolin-2 - ylidene)amino]methylene]amino]-3-methylthiazolium bromide, from 1,3-bis(3-methyl-4-thiazolin-2-ylidene)-2-thiourea and 1-bromodecane by heating at reflux for 3 hours in acetonitrile; M.P. 184–186° C. after crystallization from acetonitrile-ethyl acetate.

Example 33: A mixture of 3.3 g. of 1,3-bis(3-octyl-4-thiazolin-2-ylidene)-2-thiourea, 0.9 ml. of benzyl chloride and 10 ml. of acetonitrile is allowed to stand at room temperature for 16 hours. The resulting product, 2-[[(benzylthio)[3-octyl - 4 - thiazolin - 2 - ylidene)amino]methylamino]amino]-3-octylthiazolium chloride, is collected by filtration; M.P. 173–177° C. after crystallization from acetonitrile-ethyl acetate.

The following Examples 34–47 illustrate the preparation of other thiazolium salts in a similar manner, by reaction of the appropriate thiourea with a slight to moderate excess of haloalkane:

Example 34: 2 - [[(butylthio)[(3 - isopentyl - 4 - thiazolin - 2 - ylidene)amino]methylene]amino] - 3 - isopentylthiazolium bromide from 1,3-bis(3-isopentyl-4-thiazolin-2-ylidene)-2-thiourea and 1-bromobutane by standing at room temperature for 3 days in acetonitrile; M.P. 210–214° C. after crystallization from acetonitrile.

Example 35: 3 - isopentyl - 2 - [[[(3 - isopentyl-4-thiazolin - 2 - ylidene)amino](pentylthio)methylene]amino] thiazolium bromide from 1,3-bis(3-isopentyl-4-thiazolin-2-ylidene)-2-thiourea and 1-bromopentane by standing at room temperature for 3 days in acetonitrile; M.P. 180–181° C. after crystallization from acetonitrile-ethyl acetate.

Example 36: 2 - [[(hexylthio)[(3 - isopentyl - 4 - thiazolin - 2 - ylidene)amino]methylene]amino]-3-isopentylthiazolium bromide from 1,3-bis(3-isopentyl-4-thiazolin-2-ylidene)-2-thiourea and 1-bromohexane by standing at room temperature for 3 days in acetonitrile; M.P. 173–174° C. after crystallization from acetonitrile-ethyl acetate.

Example 37: 2 - [[(butylthio)[3 - heptyl - 4 - thiazolin-2-ylidene)amino]methylene]amino] - 3 - heptylthiazolium bromide from 1,3-bis(3-heptyl - 4 - thiazolin-2-ylidene)-2-thiourea and 1-bromobutane by standing at room temperature for 20 hours in acetonitrile; M.P. 158–159° C. after crystallization from acetonitrile-ethyl acetate.

Example 38: 3 - heptyl - 2 - [[[(3 - heptyl-4-thiazolin-2 - ylidene)amino](pentylthio)methylene]amino]thiazolium bromide from 1,3-bis(3-heptyl-4-thiazolin-2-ylidene) 2-thiourea and 1-bromopentane by standing at room temperature for 20 hours in acetonitrile; M.P. 164–165° C. after crystallization from acetonitrile-ethyl acetate.

Example 39: 3-heptyl-2-[[[(3-heptyl-4-thiazolin-2-ylidene)amino](hexylthio) methylene] amino] thiazolium bromide from 1,3-bis(3-heptyl-4-thiazolin-2-ylidene)-2-thiourea and 1-bromohexane by standing at room temperature for 20 hours in acetonitrile; M.P. 165–167° C. after crystallization from acetonitrile-ethyl acetate.

Example 40: 3-butyl-2-[[[(3-butyl-4-methyl-4-thiazolin - 2 - ylidene)amino](butylthio)methylene]amino]-4-methylthiazolium bromide, monohydrate from 1,3-bis(3-butyl-4-methyl - 4 - thiazolin-2-ylidene)-2-thiourea and 1-bromobutane by standing at room temperature for 1 day in acetonitrile; M.P. 106–109° C. after crystallization from acetonitrile-ethyl acetate.

Example 41: 3-butyl-2-[[[(3-butyl-4-methyl-4-thiazolin - 2 - ylidene)amino](pentylthio)methylene]amino-4- methylthiazolium bromide, monohydrate from 1,3-bis(3-butyl-4-methyl - 4 - thiazolin-2-ylidene)-2-thiourea and 1-bromopentane by standing at room temperature for 1 day in acetonitrile; M.P. 141–142° C. after crystallization from ethyl acetate-ether-ethanol.

Example 42: 3-butyl-2-[[[(3-butyl-4-methyl-4-thiazolin - 2 - ylidene)amino](hexylthio)methylene]amino]-4-methylthiazolium bromide from 1,3-bis(3-butyl-4-methyl-4-thiazolin-2-ylidene)-2-thiourea and 1-bromohexane by standing at room temperature for 1 day in acetonitrile; M.P. 136–137° C. after crystallization from ethyl acetate-ether.

Example 43: 3-octyl-2-[[[(3-octyl - 4 - thiazolin-2 - ylidene)amino](pentylthio)methylene]amino]thiazolium bromide from 1,3-bis(3-octyl-4-thiazolium-2-ylidene)-3-thiourea and 1-bromopentane by standing at room temperature for 20 hours in acetonitrile; M.P. 160–161° C. after crystallization from acetonitrile-ethyl acetate.

Example 44: 2 - [[(hexylthio)[(3-octyl-4-thiazolin-2 - ylidene)amino]methylene]amino]-3-octylthiazolium bromide from 1,3-bis(3-octyl-4-thiazolin-2-ylidene)-2-thiourea and 1-bromohexane by standing at room temperature for 20 hours in acetonitrile; M.P. 164–165° C. after crystallization from acetonitrile-ethyl acetate.

Example 45: 2-[[(butylthio)[(3-isohexyl-4-thiazolin-2 - ylidene)amino]methylene]amino] - 3 - isohexylthiazolium bromide from 1,3-bis(3-isohexyl-4-thiazolin-2-ylidene)-2-thiourea and 1-bromobutane by standing at room temperature for 3 days in acetonitrile; M.P. 190–192° C. after crystallization from acetonitrile-ethyl acetate.

Example 46: 3-isohexyl-2-[[[(3-isohexyl-4-thiazolin-2 - ylidene)amino](pentylthio)methylene]amino]thiazolium bromide from 1,3-bis(3-isohexyl-4-thiazolin-2-ylidene)-2-thiourea and 1-bromopentane by standing at room temperature for 3 days in acetonitrile; M.P. 180–181° C. after crystallization from acetonitrile-ethyl acetate.

Example 47: 2-[[(hexylthio)[(isohexyl-4-thiazolin-2 - ylidene)amino]methylene]amino] - 3 - isohexylthiazolium bromide from 1,3-bis(3-isohexyl-4-thiazolin-2-ylidene)-2-thiourea and 1-bromohexane by standing at room temperature for 3 days in acetonitrile; M.P. 163–164° C. after crystallization from acetonitrile-ethyl acetate.

Example 48: A solution of 2.0 g. of 2,4-dichlorobenzyl chloride is added to a suspension of 3.55 g. of 1,3-bis(3-butyl-4-thiazolin-2-ylidene)-2-thiourea in 30 ml. of dichloromethane. The mixture is stirred for about 10 minutes and the resulting solution is allowed to stand at room temperature for 16 hours, then diluted with ethyl acetate. The product, 3-butyl-2-[[[(3-butyl-4-thiazolin-2-ylidene)amino][(2,4 - dichlorobenzyl)thio]methylene]amino]thiazolium chloride, is removed by filtration and crystallized from acetonitrile; M.P. 193–195° C.

Examples 49–53 which follow illustrate the preparation of other thiazolium salts in a manner similar to Example 48:

Example 49: 2-[[(butylthio)[(3-ethyl-4-thiazolin-2-ylidene)amino]methylene]amino] - 3 - ethylthiazolium bromide, monohydrate from 1,3-bis(3-ethyl-4-thiazolin-2-ylidene)-2-thiourea and 1-bromobutane by standing at room temperature for 2 hours in dichloromethane; M.P. 119–122° C. after crystallization from acetonitrile-ethyl acetate.

Example 50: 2-[[(benzylthio)[(3-ethyl-4-thiazolin-2-ylidene)amino]methylene]amino] - 3 - ethylthiazolium chloride from 1,3-bis(3-ethyl-4-thiazolin-2-ylidene)-2-thiourea and benzyl chloride by standing at room temperature for 20 hours in dichloromethane; M.P. 191–195° C. after crystallization from acetonitrile-ethyl acetate.

Example 51: 3-ethyl-2-[[[(3-ethyl-4-thiazolin-2-ylidene)amino][(α - methylbenzyl)thio]methylene]amino] thiazolium bromide from 1,3-bis(3-ethyl-4-thiazolin-2-ylidene)-2-thiourea and α-methylbenzyl bromide by standing at room temperature for 3 days in dichloromethane.

Example 52: [[[(2,4-dichlorobenzyl)thio][(3-ethyl-4-thiazolin - 2 - ylidene)amino]methylene]amino]-3-ethylthiazolium chloride from 1,3-bis(3-ethyl-4-thiazolin-2-ylidene)-2-thiourea and 2,4-dichlorobenzyl chloride by standing at room temperature for 3 days in dichloromethane; M.P. 212–215° C. after crystallization from ethyl acetate-dichloromethane.

Example 53: 3-butyl-2-[[[(3-butyl-4-thiazolin-2-ylidene) - amino][(3,4 - dichlorobenzyl)thio]methylene] amino]thiazolium chloride from 1,3-bis(3-butyl-4-thiazolin-2-ylidene)-2-thiourea and 3,4-dichlorobenzyl chloride by standing at room temperature for 16 hours in dichloromethane; M.P. 196–199° C. after recrystallization from acetonitrile.

Example 54: A mixture of 3.0 g. of 1,3-bis(3-benzyl-4-thiazolin-2-ylidene)-2-thiourea, 10 ml. of 1-bromohexane and 80 ml. of chloroform is heated at reflux for 2.5 hours, then evaporated at reduced pressure. Unreacted 1-bromohexane is decanted from the viscous residue. The residue is crystallized from acetonitrile-ethyl acetate to give 3-benzyl-2-[[[(3-benzyl-4-thiazolin - 2 - ylidene)amino](hexylthio)methylene]amino]thiazolium bromide; M.P. 127–128° C. By the same procedure, the product 3-benzyl - 2 - [[[(3-benzyl-4-thiazolin-2-ylidene)amino](benzylthio)methylene]amino]thiazolium chloride is obtained from 1,3-bis(3-benzyl-4-thiazolin-2-ylidene)-2-thiourea and benzyl chloride by heating at reflux for 1 hour in chloroform-methylene chloride; M.P. 196–199° C. after crystallization from acetonitrile-chloroform. Also, 3-benzyl-2-[[[(3-benzyl - 4 - thiazolin-2-ylidene)amino](phenethylthio)methylene]amino]thiazolium bromide is obtained from 1,3-bis(3-benzyl-4-thiazolin-2-ylidene)-2-thiourea and phenethyl bromide by heating at reflux for 1.5 hours in chloroform; M.P. 167–168° C. after crystallization from acetonitrile-ethyl acetate.

Example 55: A mixture of 1.8 g. of 1,3-bis(3-butyl-4-thiazolin-2-ylidene)-2-thiourea and 7.0 ml. of phenethyl bromide is heated at 95–100° C. for 10 minutes, then cooled. The residue is triturated with 100 ml. of ethyl acetate and the resulting solid product, 3-butyl-2-[[[(3-butyl-4-thiazolin - 2 - ylidene)amino](phenethylthio) methylene]amino]thiazolium bromide, is collected by filtration; M.P. 153–155° C. after crystallization from acetonitrile.

PREPARATION OF STARTING MATERIALS

The starting materials for producing the products of the invention are novel substances which can be prepared from known starting materials. Such preparation is illustrated by the following general procedure: The 3-(R)-2-imino-4-thiazoline hydrohalide (Formula III) is prepared by heating at reflux a mixture of the halide (RX), 2-aminothiazole and isopropanol, for 20–40 hours and working up the reaction mixture, if necessary, after first concentrating the mixture and then crystallizing from a purification solvent. Particulars for representative products are as follows:

2-Imino-3-Thiazoline Hydrohalides

| RX | Ratio of reactants: RX/thiazole | Purification solvent | Melting point, °C. |
|---|---|---|---|
| $CH_2=CHCH_2Br$ | 133/100 | EtOH/ether | 112–115 |
| $CH_3(CH_2)_4Br$ | 498/300 | Acetone | 94–98 |
| $CH_3(CH_2)_5Br$ | 454/250 | do | 84–86 |
| $CH_3OCH_2CH_2Br$ | 139/100 | IsoprOH | 144–146 |
| $CH_3(CH_2)_7Br$ | 637/300 | Acetone | 103–107 |
| $C_6H_5CH_2Cl$ | 139/100 | | 178–180 |
| $CH_3(CH_2)_9Br$ | 553/230 | Acetone | 82–85 |
| $HOCH_2CH_2Br$ | 500/370 | 95% EtOH | 138–142 |
| $C_2H_5I$ | 1,092/500 | Acetone | (1) |

1 Converted salt to free base, distilled, boiling point 116–124°/15 mm., a clear colorless liquid, UV max. (in MeOH) 261 mμ.

The imine intermediate just mentioned is converted to free base form by dissolving in water (ca. ½ to 1 ml./gm.), adding 2 to 5 volumes of $CHCl_3$ and, with cooling, 20% excess of 20 N NaOH. The $CHCl_3$ layer and extracts are water washed, dried and concentrated. A solution of the imine concentrate in acetonitrile is mixed while carbon disulfide is added to cause formation of a salt of the 3-(R)-dithio-4-thiazoline-$\Delta^{2,N}$-carbamic acid with one formula weight of 3-(R)-2-imino-4-thiazoline. The product separates in solid form upon cooling first in a cold water bath and then in ice for a short period up to 2 hours. Representative products are the following:

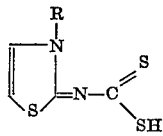

| R | X | Ratio of reactants: imine salt, gm./$CS_2$, ml. | M.P., ° C. (dec.) |
|---|---|---|---|
| $(CH_2)_3CH_3$ | Br | 79.7/25 | 139–141 |
| $CH_2CH=CH_2$ | Br | 79.2/27 | 126–129 |
| $(CH_2)_4CH_3$ | Br | 251/75 | 111–113 |
| $(CH_2)_5CH_3$ | Br | 265/75 | 105–107 |
| $CH_2CH_2OCH_3$ | Br | 130/41 | 136–139 |
| $(CH_2)_7CH_3$ | Br | 293/75 | 73–76 |
| $CH_2C_6H_5$ | Cl | 130/43 | 130–131 |
| $(CH_2)_9CH_3$ | Br | 128/30 | 78–81 |
| $CH_2CH_2OH$ |  | 0/29 | 135–140 |
| $C_2H_5$ [1] |  | 0/78 | 125–128 |

[1] Recrystallized from acetonitrile, M.P. 125–128° C. (gaseous decomp.) Anal. calc. for $C_8H_8N_2S_3 \cdot C_5H_8N_2S$: C., 39.73; H., 4.85; N., 16.85; S., 38.56 Found: C., 40.15; H., 4.90; N., 16.94; S., 38.71. UV (MeOH) max. 360, 297 and 240 mμ.

Next, the mentioned carbamic acid-imine salt is converted to the corresponding carbamic acid methyl ester by reaction with methyl iodide. For this purpose, the salt in a stirred suspension in tetrahydrofuran at 5° C. is reacted with methyl iodide added over a one-hour period and held in the cold for 1 to 5 hours longer. The mixture is then worked up either by concentration under vacuum and ether extraction, washing, drying and concentrating the residue, or by filtration and concentrating the filtrate. Representative products are as follows:

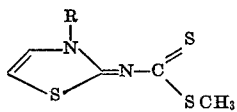

| R | Ratio of reactants: imine salt. gm./$CH_3I$, ml. | Purification solvent | M.P., ° C. |
|---|---|---|---|
| $C_4H_9$-n | 62/11 | EtOAc plus isooctane | 63–66 |
| $C_5H_{11}$-n | 184/30 | 95% EtOH | 96–98 |
| $C_6H_{13}$-n | 184/28.3 | EtOAc plus isooctane | 74–77 |
| $C_{10}H_{21}$-n | 102/11.4 | do | 62–64 |
| $CH_2CH_2OCH_3$ | 98/17 | do | 70–74 |
| $C_8H_{17}$-n | 175/22.9 | do | 64–66 |
| $CH_2C_6H_5$ | 118/16.8 | do | 89–91 |
| $CH_2CH_2OH$ | 50/8.5 | EtOAc | 129–131 |
| $C_2H_5$ | 399/81 | EtOAc plus isooctane | 86–89 |
| $CH_2CH=CH_2$ | 60.1/11.5 | do | 74–77 |

The carbamic acid ester described is converted to the 2-[[bis(methylthio)methylene]amino]-3-(R)-thiazolium iodide by treatment of a tetrahydrofuran mixture with methyl iodide, allowing the mixture to stand at room temperature for 1 to 5 days. The thiazolium iodide product is collected, washed with THF and recrystallized if necessary from acetonitrile or acetonitrile-ether. Particulars for illustrative cases are the following:

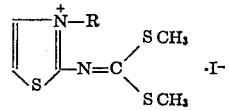

| R | Ratio of reactants: carbamate, gm./$CH_3I$, ml. | Purification solvent | M.P., ° C. (dec.) |
|---|---|---|---|
| $C_2H_5$ | 262/81 | $CH_3CN$ | [1] 152–154 |
| $CH_2CH_2OCH_3$ | 59.4/15.8 | $CH_3CN$ | 115–120 |
| $C_8H_7$-n | 100/22.4 | $CH_3CN$ plus | 110–111 |
| $CH_2C_6H_5$ | 64.5/15.7 | $CH_3CN$ | 158–162 |
| $C_{10}H_{21}$-n | 54.5/11.2 | $CH_3CN$ plus ether | 98–100 |
| $CH_2CH_2OH$ | 26.0/7.3 | $CH_3CN$ | 152–154 |
| $C_4H_9$-n | 36.0/11.0 | None | 114–117 |
| $CH_2CH=CH_2$ | 33.2/9.8 | do | 135–137 |
| $C_5H_{11}$-n | 100/26.3 | $CH_3CN$ plus ether | 123–126 |
| $C_6H_{13}$-n | 100/13.6 | do | 118–121 |

[1] Knott, J. Chem. Soc. 1956, 1644–1649 reports M.P. 147° (from ethanol ether).

The 3-thiazolinylidene-1-thiazolyl-2-thiopseudourea is prepared from the known dithio thiazolecarbamic acid methyl ester by way of the 1-thiazolinylidene-3-thiazolyl-2-thiourea. For this purpose, dithio-2-thiazolecarbamic acid, methyl ester and the appropriate 3-substituted-2-imino-4-thiazoline are reacted in 1-methyl-2-pyrrolidinone at 90° C. for 9 hours, cooled, and the precipitated product collected, washed with acetone and if desired recrystallized from dimethylformamide-methanol. Representative products are the following:

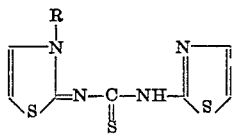

| R | Ratio of reactants: imine [1] (HX) gm./ dithiocarbamate, gm. | Solvent, ml. | M.P., ° C. |
|---|---|---|---|
| $C_2H_5$ | 128(HI)/95.0 | [2] 1,000 | 239–244 |
| $C_6H_5CH_2$ | 116/94.3 | 500 | 233–235 |
| $C_4H_9$-n | 297/209 | 500 | 212–215 |
| o-$ClC_6H_4CH_2$ | 193/96.3 | 500 | 247–249 |
| p-$ClC_6H_4CH_2$ | 224/148 | 500 | 225–258 |
| 2,4-di$Cl-C_6H_3CH_2$ | 337/147 | 500 | 262–265 |

[1] Imine salt converted to free base for reaction.
[2] Acetonitrile instead of 1-methyl-2-pyrrolidinone.

A suspension of the 1-thiazolinylidene-3-thiazolyl-2-thiourea product in dimethylformamide is stirred and sodium hydride (mineral oil dispersion) is added portionwise with external cooling, over a period of 30–60 minutes. The mixture is stirred for 1–2 hours with warming to room temperature. The halide $R_1X$ is added and the mixture is stirred further for 1–2 hours. Toluene (2–5 volumes) and about one volume of water are added with mixing and the toluene is separated and combined with further toluene extracts. The mixture is water washed, dried, filtered, concentrated, decanted with isooctane and crystallized from a purification solvent. Representative products are as follows:

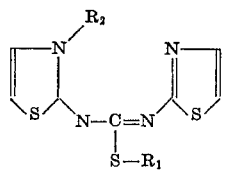

| R₂ | R₁X | Ratio of reactants: thiourea/ R₁X/NaH | Solvent (DMF), ml. | M.P., °C. | Purification solvent |
|---|---|---|---|---|---|
| CH₂C₆H₅ | C₂H₅I | 20.0/10.8/2.4 | 180 | 86–87 | EtOAc |
| CH₂C₆H₅ | n-C₄H₉I | 20.0/12.9/2.4 | 180 | 78–79 | EtOAc |
| n-C₄H₉ | C₂H₅I | 29.8/17.9/3.1 | 250 | 68–70 | EtOAc |
| n-C₄H₉ | C₆H₅CH₂Cl | 14.9/7.4/1.5 | 150 | 101–103 | EtOAc |
| n-C₄H₉ | n-C₄H₉I | 29.8/21.0/3.1 | 250 | Oil | |
| n-C₄H₉ | CH₃OOCCH₂Cl | 14.9/6.3/1.3 | 150 | 84–86 | 95% EtOH. |
| n-C₄H₉ | (C₂H₅)₂NCOCH₂Cl | 20.1/11.5/1.9 | 150 | 120–122 | EtOAc plus issoctane. |
| o-ClC₆H₄CH₂ | CH₃I | 51.4/22.7/4.0 | 425 | 112–113 | EtOAc |
| p-ClC₆H₄CH₂ | CH₃I | 80.7/32.5/5.7 | 650 | 168–171 | Toluene. |
| 2,4-diCl-C₆H₃CH₂ | CH₃I | 80.3/30.0/5.3 | 650 | 142–144 | Do. |
| n-C₄H₉ | CH₂=CHCH₂Cl | 20.0/5.6/2.1 | 150 | 56–60 | EtOAc plus isooctane. |
| C₂H₅ | CH₃I | 8.1/5.0/1.0 | 80 | 112–114 | Aq. EtOH. |

The 1,3 - bis(3-substituted-4-thiazolin-2-ylidene)-2-thiourea starting materials are prepared by reacting thiophosgene with the corresponding 3-substituted-2-imino-4-thiazoline under basic conditions, as illustrated by the following procedures:

(a) Aqueous sodium hydroxide solution (10%, 150 ml.) is added slowly to a stirred mixture of 3-butyl-2-imino - 4-thiazoline hydrobromide (47.5 g.), water (200 ml.) and chloroform (150 ml.) maintained at ice bath temperature. A solution of thiophosgene (11.5 g.) in chloroform (165 ml.) is added dropwise over one-half hour at 5–10° C., and the resulting mixture is stirred at ambient temperature for 2 hours. The organic layer is separated, washed with dilute HCl and with water, dried and treated with charcoal. The product separating in solid form on addition of hexane is 1,3 - bis(3-butyl-4-thiazolin-2-ylidene)-2-thiourea; M.P. 138–140° C. after recrystallization from toluene-hexane.

(b) A solution of 199 g. of 2-imino-3-hexyl-4-thiazoline hydrobromide and 210 ml. of triethylamine in 1.5 liters of chloroform is cooled below —10° and a solution of 28.6 ml. of thiophosgene in 100 ml. of chloroform is added slowly with vigorous stirring over a period of 45 minutes. The solution is allowed to warm to room temperature and washed four times with 400 ml. portions of water, then dried. The solvent is removed at reduced pressure and the residual oil dissolved in 550 ml. of 2-propanol. The solution is cooled to 0–5° C. and the resulting precipitate of 1,3-bis(3-hexyl-4-thiazolin-2-ylidene)-2-thiourea is removed by filtration; M.P. 78–79° C. after recrystallization from 2-propanol.

In a similar manner, by reaction of the appropriately substituted thiazoline salt with triethylamine and thiophosgene in chloroform solution, other thioureas are obtained such as the following:

|  | M.P., °C. |
|---|---|
| 1,3 - bis(3 - methyl-4-thiazolin-2-ylidene)-2-thiourea | 258–260 |
| 1,3 - bis(3 - ethyl - 4-thiazolin-2-ylidene)-2-thiourea | 157.5–159.5 |
| 1,3 - bis(3 - propyl-4-thiazolin-2-ylidene)-2-thiourea | 192–194 |
| 1,3 - bis(3 - butyl - 4-thiazolin-2-ylidene)-2-thiourea | 138–140 |
| 1,3 - bis(3 - pentyl-4-thiazolin-2-ylidene)-2-thiourea | 112–114 |
| 1,3 - bis(3 - octyl - 4-thiazolin-2-ylidene)-2-thiourea | 63–65 |
| 1,3 - bis(3 - isopentyl-4-thiazolin-2-ylidene)-2-thiourea | 140–141 |
| 1,3 - bis(3 - benzyl-4-thiazolin-2-ylidene)-2-thiourea | 192–194 |
| 1,3 - bis[3 - (p-chlorobenzyl)-4-thiazolin-2-ylidene]-2-thiourea | 182–183 |
| 1,3 - bis[3 - (o-chlorobenzyl)-4-thiazolin-2-ylidene]-2-thiourea | 186–187 |
| 1,3 - bis[3 - (3,4-dichlorobenzyl)-4-thiazolin-2-ylidene]-2-thiourea | 202–204 |
| 1,3 - bis[3 - (2,4-dichlorobenzyl)-4-thiazolin-2-ylidene]-2-thiourea | 185–186 |
| 1,3 - bis(3 - butyl - 4-methyl-4-thiazolin-2-ylidene)-2-thiourea | 139–141 |
| 1,3 - bis(3 - heptyl-4-thiazolin-2-ylidene)-2-thiourea | 68–69 |
| 1,3 - bis(3-isohexyl-4-thiazolin-2-ylidene)-2-thiourea | 58–59 |
| 1,3 - bis[3 - (2-phenoxyethyl)-4-thiazolin-2-ylidene]-2-thiourea | 125–128 |
| 1,3 - bis(3 - phenethyl-4-thiazolin-2-ylidene)-2-thiourea |  |

I claim:

1. A 2-[[[(4-thiazolin-2 - ylidene)amino](substituted thio)methylene]amino]thiazolium salt having the formula

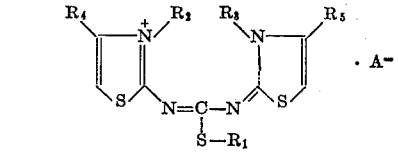

where $R_1$ is a $C_1$–$C_{10}$ alkyl, —CH₂CON(lower alkyl)₂, —CH₂COO(lower alkyl) phenethyl, 2-phenoxyethyl, benzyl, α-methylbenzyl, mono- or dichlorobenzyl, or allyl group; $R_2$ and $R_3$ are the same or different and independently represent a $C_1$–$C_{10}$ alkyl, —CH₂CH₂OCH₃, —CH₂CH₂OH, benzyl, mono- or dichlorobenzyl, phenethyl, or 2-phenoxyethyl group, one of $R_2$ and $R_3$ also representing a —CH₂CON(lower alkyl)₂ or —CH₂COO (lower alkyl) group; $R_4$ and $R_5$ are the same or different and independently represent H of CH₃; and A is a pharmaceutically acceptable anion.

2. A 3-butyl-2-[[[(3-butyl - 4 - thiazolin - 2 - ylidene)amino](methylthio)methylene]amino]thiazolium salt according to claim 1.

3. A 3-hexyl-2-[[[(3-hexyl - 4 - thiazolin - 2 - ylidene)amino](methylthio)methylene]amino]thiazolium salt according to claim 1.

4. 3-butyl-2-[[[3-(2,4-dichlorobenzyl) - 4 - thiazolin-2 - ylidene]amino](methylthio)methylene]amino]thiazolium salt according to claim 1.

5. A 2-[[[(3-butyl-4-thiazolin - 2 - ylidene)amino](methylthio)methyl]amino] - 3 - hexylthiazolium salt according to claim 1.

6. A 2-[[[3-benzyl-4 - thiazolin - 2 - ylidene)amino](butylthio)methylene]amino] - 3 - butylthiazolium salt according to claim 1.

7. A 3-butyl-2-[[[(3 - butyl - 4 - thiazolin - 2-ylidene)amino](butylthio)methylene]amino]thiazolium salt according to claim 1.

8. A 2-[[(methylthio)[3-octyl-4-thiazolin-2 - ylidene)amino]methylene]amino]-3-octylthiazolium salt according to claim 1.

9. A 3-ethyl-2-[[[(3-ethyl-4 - thiazolin - 2 - ylidene)amino](hexylthio)methylene]amino]thiazolium salt according to claim 1.

10. A 2-[[(butylthio)[)3-hexyl-4-thiazolin-2-ylidene)amino]methylene]amino]-3-hexylthiazolium salt according to claim 1.

11. A 3-butyl-2-[[[(3-butyl-4-thiazolin - 2 - ylidene)amino[[(3,4 - dichlorobenzyl)thio]methylene]amino]thiazolium salt according to claim 1.

12. A 3-butyl-2-[[[(3-butyl-4-thiazolin - 2 - ylidene)amino](phenethylthio)methylene]amino]thiazolium salt according to claim 1.

13. A 2-[[(hexythio)[3-propyl-4-thiazolin-2 - ylidene)amino]methylene]amino]-3-propylthiazolium salt according to claim 1.

14. Process for the production of 2-[[[(4-thiazolium-2 - ylidene)amino](methylthio)methylene]amino]thiazolium salts according to claim 1 having the formula

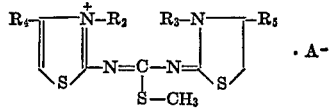

comprising reacting a 2 - [[bis(methylthio)methylene]amino]thiazolium salt having the formula

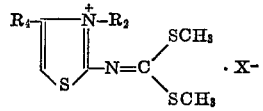

and a 2-imino-4-thiazoline having the formula

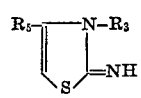

and isolating the product, where appropriate after conversion from a salt of a different anion; where $R_2$, $R_3$, $R_4$ and $R_5$ and A are as defined in claim 1 and X is a chloride, bromide or iodide ion or a tosylate or methanesulfonate group.

15. Process according to claim 14 using acetonitrile as a solvent at temperatures in the range from 0 to 30° C.

16. Process for the production of 2-[[[(4-thiazolium-2 - ylidene)amino](methylthio)methylene]amino]thiazolium salts according to claim 1 having the formula

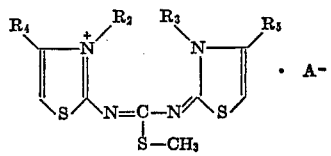

comprising reacting methyliodide and a salt of dithio-4-thiazoline-$\Delta^{2,N}$-carbamic acid having the formula

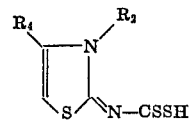

in an aqueous two-phase reaction medium in the presence of sodium hydroxide in molar ratios in the range from 2:1:1 to 10:2:1 with a 2-imino-4-thiazoline having the formula

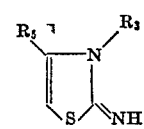

and isolating the product, where appropriate after conversion from a salt of a different anion; where $R_3$, $R_4$ and $A^-$ are as defined in claim 1, and $R_2$ and $R_3$ each represent a $C_1$-$C_{10}$ alkyl group.

17. Process according to claim 16 where the molar ratio is 5:1:1.

18. Process for the production of α-[[[(4-thiazolium-2 - ylidene)amino](substituted thio)methylene]amino]thiazolium salts according to claim 1 having the formula

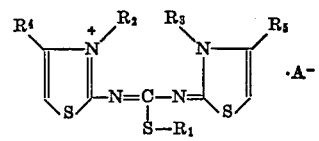

comprising reacting a compound $R_3X$ and a 3-(4-thiazolin-2-ylidene)-2-$R_1$-1-(2 - thiazolyl) - 2 - thiopseudourea having the formula

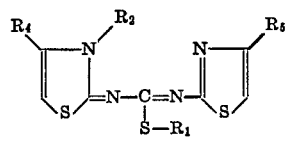

in a non-reactive organic solvent and isolating the product, where appropriate after conversion from a salt of a different anion; where $R_1$, $R_2$, $R_3$, $R_4$, $R_5$ and A are as defined in claim 1 and X is a chloride, bromide or iodide ion or a tosylate or methansulfonate group.

19. Process according to claim 18 where the ratio of reactants $R_3X$ and thiopseudourea is in the range from 3:1 to 6:1.

20. Process for the production of 2-[[[(4-thiazolium-2 - ylidene)amino](substituted thio)methylene]amino]thiazolium salts according to claim 1 having the formula

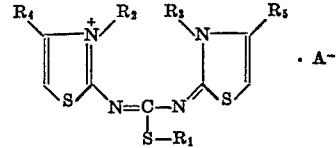

comprising reacting a compound $R_1X$ and the corresponding 1,3-bis(3-substituted-4-thiazolin) - 2 - thiourea having the formula

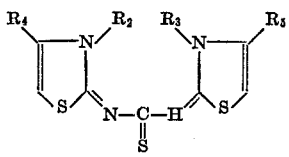

and isolating the product, where appropriate after conversion from a salt of a different anion; where $R_1$, $R_2$, $R_3$, $R_4$, $R_5$ and A are as defined in claim 1 and X is a chloride, bromide or iodide ion or a tosylate or methanesulfonate group.

21. Process according to claim 20 where the compound $R_1X$ is employed in molar excess and the reaction temperatures are in the range from 0 to 70° C.

References Cited
UNITED STATES PATENTS

| | | | |
|---|---|---|---|
| 3,309,377 | 3/1967 | Surrey | 260—306.7 |
| 3,370,051 | 2/1968 | Sullivan et al. | 260—306.7 |
| 3,578,666 | 5/1971 | Manning | 260—306.7 |

FOREIGN PATENTS

| | | | |
|---|---|---|---|
| 1,498,008 | 9/1967 | France | 260—306.7 |

RICHARD J. GALLAGHER, Primary Examiner

U.S. Cl. X.R.

260—286 R, 294.8 C, 306.8 R; 424—232, 258, 263, 270